United States Patent [19]

Decouzon

[11] 4,070,036
[45] Jan. 24, 1978

[54] REAR AXLE FOR MOTOR VEHICLE

[75] Inventor: Georges Decouzon, Boulogne Billancourt, France

[73] Assignee: Regie Nationale des Usines Renault, Boulogne-Billancourt, France

[21] Appl. No.: 705,580

[22] Filed: July 15, 1976

[30] Foreign Application Priority Data

July 22, 1975 France .................................. 75 22783

[51] Int. Cl.² .......................................... B60G 11/26
[52] U.S. Cl. ..................................... 280/710; 280/662
[58] Field of Search ............... 280/710, 660, 662, 663, 280/666, 673, 675, 689; 267/20

[56] References Cited

U.S. PATENT DOCUMENTS

| | | | |
|---|---|---|---|
| 2,678,830 | 5/1954 | Cigan et al. ........................... | 280/662 |
| 3,125,332 | 3/1964 | Peras ..................................... | 280/673 |
| 3,139,275 | 6/1954 | Burkitt ................................... | 280/673 |

*Primary Examiner*—Richard A. Bertsch
*Attorney, Agent, or Firm*—Fleit & Jacobson

[57] ABSTRACT

A rear axle for motor vehicle, which comprises a rigid axle member pivotally mounted at its ends to the relevant stub-axle brackets by substantially horizontal pivot pins parallel to the longitudinal axis of the vehicle, the stub-axle brackets being on the other hand secured to the body of the vehicle by longitudinal tie-rods, one of the longitudinal tie-rods being further connected in the vicinity of its relevant bracket to an oblique tie-rod having its opposite end also secured to the body, each bracket being also secured to a vertical shock absorber surrounded by a coil compression spring.

7 Claims, 5 Drawing Figures

REAR AXLE FOR MOTOR VEHICLE

The present invention relates in general to the suspension systems of motor vehicles and has specific reference to an improved rear axle for motor vehicles which has a pivoted structure and independent wheels.

At present, the rear axles of front-drive motor vehicles constitute two main groups, namely:
rigid-axle wheel structures,
independent wheel structures.

Conventional rigid rear axles are notoriously attended by various inconveniences. Thus, when negotiating a turn, the centrifugal force causes the vehicle body to assume an inclined position to the horizontal and therefore the wheel arches must have a volume sufficient to prevent the wheel from contacting the vertical inner walls thereof. It is evident that the volume available inside the vehicle body, notably in the rear boot or luggage compartment, is inversely proportional to the volume required for the wheel arches.

Now the rigid axle is necessarily fastened to the sprung portion of the vehicle by means of a central fastening device which is rigid with the central portion of the body floor, to which it is welded. However, since the strength of this body element (i.e., the floor) is usually not sufficient, or at least questionable, the provision of a beam or like section for reinforcing the assembly is required, said beam or like section being in turn rigidly secured to reinforced floor portions, thus involving additional weight and cost.

It is the essential object of the present invention to avoid the above-mentioned inconveniences and also other inconveniences to be mentioned hereinafter with reference to the drawing, by providing an improved arrangement illustrated diagrammatically in the accompanying drawing, in which.

Figure 1:
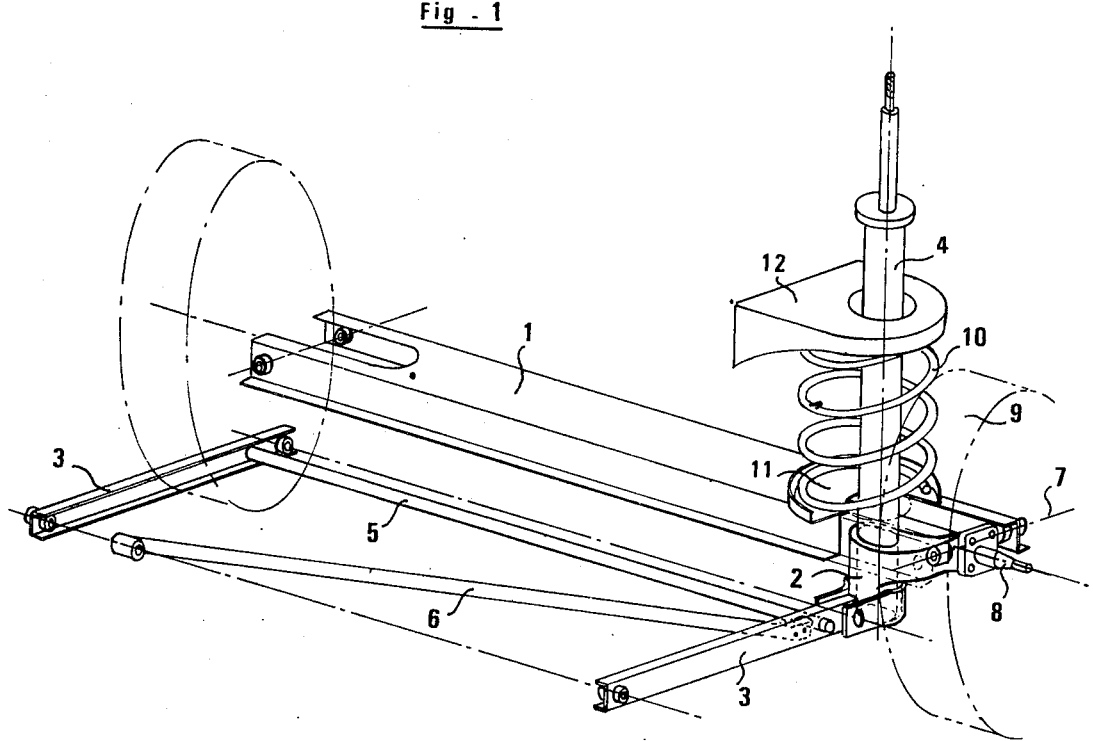
FIG. 1 is a perspective view showing a first form of embodiment of a rear axle according to this invention.
Figure 2:
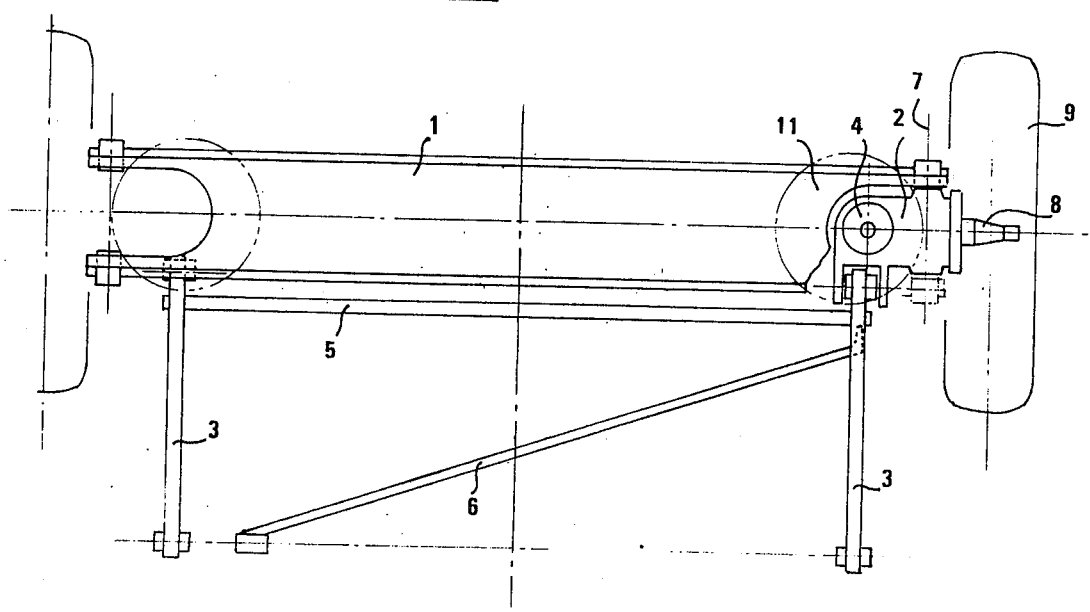
FIG. 2 is a plane view from above of the same form of embodiment.

Referring first to FIG. 1, it will be seen that the rear axle 1 comprises an open section, notably a U-shaped section, obtained by simply pressing a sheet metal blank, the upper solid or web portion of which being notched at its ends to permit the passage of the lower end portion of the shock absorbers. Each stub-axle bracket 2 is retained by a longitudinal tie-rod 3 and a shock absorber 4, having their opposite ends rigidly secured to the conventionally reinforced portions of the vehicle body which consist of the lower side longitudinal members or valances, and the shock-absorber supporting areas.

The longitudinal tie rods 3 are also interconnected at their ends adjacent the axle 1 by an anti-roll bar 5, and also in this area a complementary oblique tie-rod 6 is provided for rigidly connecting one of said tie-rods 3 to the floor of the vehicle in order to improve the transversal rigidity of the assembly.

Besides, the stub-axle bracket 2 is assembled to the axle 1 by means of a substantially horizontal pivot pin 7 parallel to the longitudinal centre line of the vehicle, this pivot pin 7 supporting the stub-axle 8 of the relevant wheel 9.

In the case illustrated in FIG. 1 the suspension springs 10 are disposed between a bottom cup 11 bearing on the axle 1 and a top cap 12 rigid with the body structure.

Figure 3:
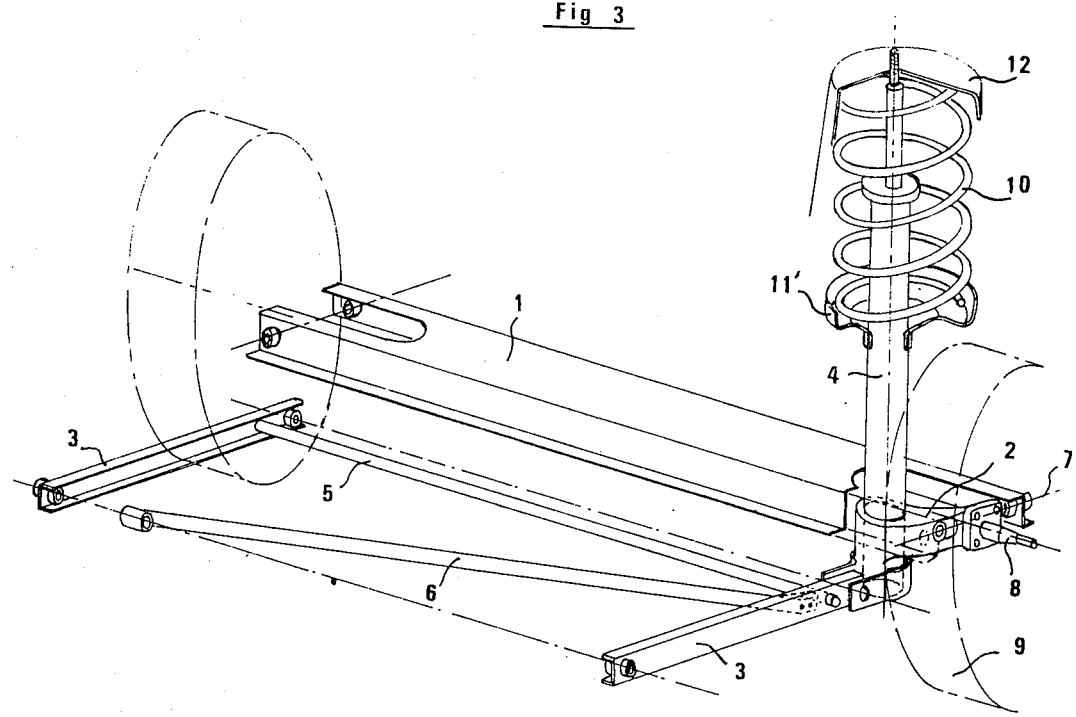
FIG. 3 is a modified form of embodiment of the invention.

In a modified form of embodiment illustrated in FIG. 3, the essential modification thus brought consists in securing the bottom cup 11' supporting the suspension spring 10 to the body of the shock absorber 4, in lieu of the axle 1.

Thus, the axle 1 is subjected only to the efforts necessary for maintaining the wheel track and those resulting from the steering of the wheels, in contrast to the first form of embodiment shown in FIG. 1 wherein the weight of the sprung portion of the vehicle has to be supported by the axle 1.

However, in either case, during a brake application no torsion stresses are exerted, in contrast to what is observed with a conventional rigid axle, for in this modified structure said stresses are supported by the longitudinal tie-rods 3 and by the shock absorbers 4. Thus, less resistant and therefore lighter and more economical axles can be used. Consequently, the axle 1 may have a smaller cross-section and a simpler configuration: for example, instead of beam sections of cylindrical or polygonal cross-sectional contour, a simple U-sectioned pressed sheet metal member, as shown in FIGS. 1 and 3, may be used without any inconvenience.

This is also advantageous on account of its greater ease of manufacture since the welding operations are dispensed with and the member is less exposed to internal oxidation, as observed with most hollow bodies, since moisture and humidity cannot accumulate therein as in a closed member.

Figure 4A:
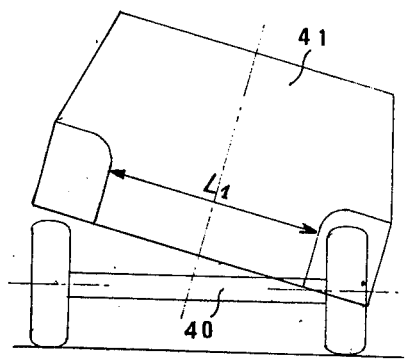
FIGS. 4A and 4B illustrate the influence exerted by the present invention on the volume of the wheel arches.
Figure 4B:
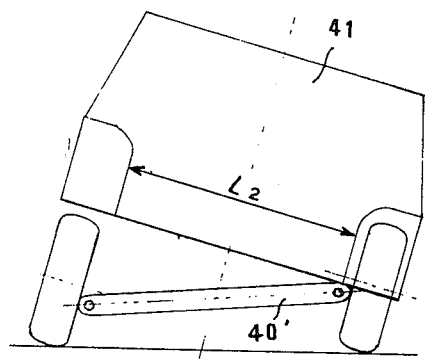

FIGS. 4A and 4B illustrate diagrammatically the respective positions of the various component elements of a motor vehicle equipped the one with the conventional rigid axle structure and the other with the axle structure of this invention, during the negotiation of a turn.

FIG. 4A showing a conventional rigid axle 40 proves that the inclination of the vehicle body 41 requires a relatively wide wheel arch to prevent the wheel from rubbing the inner vertical wall of this arch.

In contrast thereto, as shown in FIG. 4B, while the body is inclined by the centrifugal force the wheel 9 remains parallel to the vertical wall of the wheel arch due to the pivotal mounting about the pivot pin 7 of the stub axle bracket 2 on the axle proper 40'.

Obviously, in the case of the present invention the width of the wheel arch can be considerably narrower than in the case of a conventional rigid axle structure, so that the volume available in the body is increased, the width L2 being greater than L1.

Besides, it will be seen that the axle according to this invention is connected to the vehicle body only through the tie-rods 3, 5 and 6, and by the shock absorbers 4, without resorting to any central fastening means as mentioned in the foregoing. Now this arrangement is advantageous not only in that it affords substantial savings in weight and cost, but also in that it frees the space formerly occupied by this central fastening means, whereby the ground clearance can be reduced or the floor lowered more or less, thus affording additional space savings.

Consequently, the device of this invention possesses the advantageous features of suspension systems having independent wheel arms, without having the complicated structure characterising these systems.

In fact, it is known that in these known arrangements the independent wheel arms require the use of two bearings per arm for securing the arm to the vehicle body, that is, two central fastening members disposed just under the floor in a usually scarcely rigid portion of the vehicle. This obviously constitutes a source of vibration and noise detrimentally perceived by the driver and passengers of the vehicle.

As in the case of a conventional rigid axle structure, some means must be provided for reinforcing these fastening areas. On the other hand and similarly, when applying the brakes the suspension arms are usually the seat of torsion stresses which make it necessary as a rule to use closed structures (of polygonal or cylindrical configuration) having a greater strength.

This inconvenience is safely avoided with the present invention, since parts of simplified design and structure can be used.

Although specific forms of embodiment of this invention have been described hereinabove and illustrated in the accompanying drawing, it will readily occur to those skilled in the art that various modifications and changes may be brought thereto without departing from the scope of the invention as set forth in the appended claims.

What is claimed as new is:

1. Rear axle for a motor vehicle comprising:
   a rigid axle member extending transversely to the longitudinal axis of the vehicle;
   stub-axle brackets positioned at each end of said rigid axle member;
   substantially horizontal pivot pins extending parallel to the longitudinal center line of the vehicle for pivotally mounting each end of said rigid axle member to a respective one of said stub-axle brackets;
   longitudinally-extending tie-rods associated with each of said stub-axle brackets, one end of each of said longitudinally-extending tie-rods being connected to a respective one of said stub-axle brackets and the other end being secured to the body of the vehicle;
   a tie-rod extending obliquely to the longitudinal axis of the vehicle, one end of said tie-rod being connected to one of said longitudinally-extending tie-rods close to the connection of the tie-rod to said stub-axle bracket and the other end being secured to the body of the vehicle; and
   vertical shock absorbers surrounded by coil compression springs for connecting each of said longitudinally-extending tie-rods to the body of the vehicle.

2. Rear axle for motor vehicle as set forth in claim 1, wherein each of said coil compression springs is compressed between a top cap secured to the vehicle body and a bottom cup rigidly secured to the body of the shock absorber.

3. Rear axle for motor vehicle as set forth in claim 1 further including a tie-rod extending parallel to said rear axle and being connected at its opposite ends to said longitudinally-extending tie-rods.

4. Rear axle for motor vehicle as set forth in claim 1, wherein each of said coil compression springs is compressed between a top cap secured to the vehicle body and a bottom cup bearing on the top surface of the axle member.

5. Rear axle for motor vehicle as set forth in claim 4, wherein the bottom cup supporting the coil compression spring is rigidly secured to the body of the shock absorber.

6. Rear axle for motor vehicle as set forth in claim 1, wherein said axle member comprises a generally U-shaped section member pressed from a sheet metal blank.

7. Rear axle for motor vehicle as set forth in claim 1, wherein the ends of the axle member are notched to permit the passage of the lower portions of the shock absorbers.

* * * * *